US012238065B2

United States Patent
Mitchell et al.

(10) Patent No.: US 12,238,065 B2
(45) Date of Patent: Feb. 25, 2025

(54) MANAGING TRAFFIC RULES IN ASSOCIATION WITH FULLY QUALIFIED DOMAIN NAMES (FQDNS) USING POSTURE INFORMATION ASSOCIATED WITH DNS RECORDS

(71) Applicant: HYAS Infosec Inc., Vancouver (CA)

(72) Inventors: David James Mitchell, Danville, CA (US); Paul Cornelius van Gool, Santa Barbara, CA (US)

(73) Assignee: HYAS Infosec Inc., Vancouver (CA)

( * ) Notice: Subject to any disclaimer, the term of this patent is extended or adjusted under 35 U.S.C. 154(b) by 73 days.

(21) Appl. No.: 17/684,143

(22) Filed: Mar. 1, 2022

(65) Prior Publication Data
US 2023/0283591 A1    Sep. 7, 2023

(51) Int. Cl.
*G06F 21/00* (2013.01)
*H04L 9/40* (2022.01)
*H04L 61/4511* (2022.01)

(52) U.S. Cl.
CPC ...... *H04L 63/0236* (2013.01); *H04L 61/4511* (2022.05); *H04L 63/0263* (2013.01); *H04L 63/029* (2013.01)

(58) Field of Classification Search
CPC ............. H04L 63/0236; H04L 61/4511; H04L 63/0263; H04L 63/029
See application file for complete search history.

(56) References Cited

U.S. PATENT DOCUMENTS

| | | | | |
|---|---|---|---|---|
| 2014/0150051 A1* | 5/2014 | Bharali | ................ | H04L 47/286 726/1 |
| 2016/0065597 A1* | 3/2016 | Nguyen | .............. | H04L 63/1441 726/22 |
| 2016/0359917 A1* | 12/2016 | Rao | ...................... | G06F 3/04842 |
| 2018/0343272 A1* | 11/2018 | Khalil | ..................... | G06F 21/56 |
| 2020/0314065 A1* | 10/2020 | Roy | .................... | H04L 63/0209 |
| 2020/0314107 A1* | 10/2020 | Joshi | ....................... | H04L 63/10 |
| 2021/0258325 A1* | 8/2021 | Meyer | .................. | H04L 61/4511 |
| 2022/0060498 A1* | 2/2022 | Head, Jr. | ............. | H04L 12/4633 |
| 2022/0278955 A1* | 9/2022 | Roy | .................... | H04L 61/4541 |
| 2023/0112092 A1* | 4/2023 | Tymchenko | ........ | H04L 61/4511 726/23 |

* cited by examiner

*Primary Examiner* — Michael M Lee (57) ABSTRACT

Systems, methods, and software described herein manage traffic rules in association with fully qualified domain names (FQDNs). In one implementation, a domain name system (DNS) security service obtains a FQDN associated with a DNS request by a computing device. The DNS security service determines a first score for the FQDN based on trust factors associated with the FQDN and determines whether the first score satisfies one or more criteria. When the first score satisfies the one or more criteria, the DNS security service evaluates host posture information associated with an IP address in the DNS response for the FQDN, updates the first score to a second score based on the host posture information, and determines a traffic rule for the FQDN based on the second score.

20 Claims, 6 Drawing Sheets

FIGURE 5

US 12,238,065 B2

MANAGING TRAFFIC RULES IN ASSOCIATION WITH FULLY QUALIFIED DOMAIN NAMES (FQDNS) USING POSTURE INFORMATION ASSOCIATED WITH DNS RECORDS

BACKGROUND

In computing environments, firewall services may be used to monitor incoming and outgoing network traffic to permit or block data packets based on security rules. In some examples, some firewall services may provide a domain name system (DNS) resolver that is used to receive DNS requests from computing systems on a local network and provide the requesting computing system with a corresponding internet protocol (IP) address.

In some examples, DNS requests from computing systems may include fully qualified domain names (FQDNs). A FQDN specifies the exact location in the tree hierarchy of the DNS. It specifies all domain levels, including the top-level domain and the root zone. In some examples, the FQDN can have a host name and at least one higher-level domain (label) and always ends in the top-level domain. When a request is received from a computing device, a resolver may identify an IP address for the connection and provide the IP address to the requesting device. However, difficulties can arise in determining whether the connection with the IP address for the FQDN is malicious and whether a connection should be permitted with the destination associated with the FQDN.

OVERVIEW

Provided herein are systems, methods, and software to manage traffic rules in association with fully qualified domain names (FQDNs) using the host posture associated with an internet protocol (IP) address in a DNS response. In one implementation, a DNS security service may obtain a FQDN associated with a domain name system (DNS) request by a computing device and determine a first score for the FQDN based on trust factors associated with the FQDN. The DNS security service further determines whether that first score satisfies one or more criteria for further investigation and, when the first score satisfies the one or more criteria, evaluates host posture information associated with an IP address in a DNS response for the FQDN. Once evaluated, the DNS security service further updates the first score to a second score based on the host posture information and determines a traffic rule for the FQDN based on the second score.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

In many computing environments, firewalls are deployed that are used to monitor ingress and egress packets for one or more computing systems and determine whether to block, permit, redirect, or provide some other operation with respect to the packet. These determinations may be based on rules that can act on packets based on addressing in the packet, protocols for the packet, or some other factor. Here, a firewall may identify domain name system (DNS) requests from a computing system or device in the network that includes a fully qualified domain name (FQDN). A FQDN specifies the exact location in the tree hierarchy of the DNS. It specifies all domain levels, including the top-level domain and the root zone. In some examples, the FQDN can have a host name and at least one higher-level domain (label) and always ends in the top-level domain. Once the FQDN is identified, the FQDN may be provided to a DNS security service that analyzes infrastructure associated with the FQDN to determine a traffic rule for FQDN. The traffic rule may be used to permit, block, redirect, or provide some other action in association with the destination server for the FQDN.

To analyze the infrastructure associated with the FQDN, the DNS security service may analyze trust factors associated with the reputation of the DNS response for the FQDN. These trust factors may be associated with the A or AAAA records for the FQDN, the authoritative name server associated with the FQDN, the number of requests with the FQDN, or some other factor. The information for the trust factors may be maintained locally but may also be obtained from other services or databases that can provide information on the status, reputation, location, or some other information associated with the trust factors. Advantageously, rather than identifying information associated with the destination server or destination IP address, the DNS security service may process information about the reputation of the DNS response, including the services, certificates, records, and systems providing the response, to determine if the requested destination is potentially malicious. In some examples, the factors may be used to generate a trust score for the FQDN. Each of the factors may contribute to the trust score uniformly or may contribute differently to the trust score. For example, a risk assessment for a Name Server may contribute differently to the trust score than the number of requests for the FQDN.

Once the score is determined, a traffic rule may be identified from a set of traffic rules based on the score satisfying criteria for that rule. The traffic rule may then be provided to the firewall to implement the action corresponding to the rule. In implementing the traffic rule, the firewall may prevent a DNS response from being provided for the DNS request, may permit the DNS response to be provided to the requesting computing system, may block traffic associated with the IP address retrieved using the DNS request, may redirect traffic to another IP address, or may perform some other action.

In the present implementation, in addition to using the trust factors described above, the DNS security service may further determine when a score based on the trust factors satisfies criteria to obtain supplemental host posture information associated with an IP address in a DNS response for the DNS request. The IP address corresponds to a destination address to retrieve data in association with the DNS request (e.g., a webserver), and the address may be obtained by completing the DNS request associated with the FQDN. The host posture information may be used to determine whether the DNS server includes up-to-date or current software and settings. The DNS security service may check signatures, service packs, or other software information on the DNS server to support the request. Based on the posture information that is provided for the posture check, the DNS server may update the trust score associated with the FQDN. The DNS security service may then return an IP address for the request when the score satisfies criteria or may block the return of an IP address when the score does not satisfy criteria. In some implementations, the host posture information may be obtained from a secondary service, wherein the secondary service may perform periodic or some other check at intervals to different IP addresses. In other implementations, the DNS security service may initiate a host posture analysis using requests to the host associated with the IP address from the DNS response.

In some implementations, when a FQDN is received in association with a DNS request, the DNS security service may provide a first action to the requesting firewall. For example, when a DNS security service identifies a FQDN, the DNS security service may identify trust factors that are readily available (i.e., stored locally at the security service) or quickly accessible to the service and generate a score based on the factors. The score may also be cached in some examples based on previous requests. The score may then be used to select the first action. As additional information is obtained in association with the FQDN, the score can be updated. Additionally, when a score satisfies criteria (e.g., first time the score is generated in association with the FQDN), posture information may be evaluated in association with at least one IP address provided in the DNS response for the FQDN. The posture information may be retrieved from a database that maintains posture information associated with IP addresses or may be obtained or requested from the host associated with the IP address.

Figure 1:
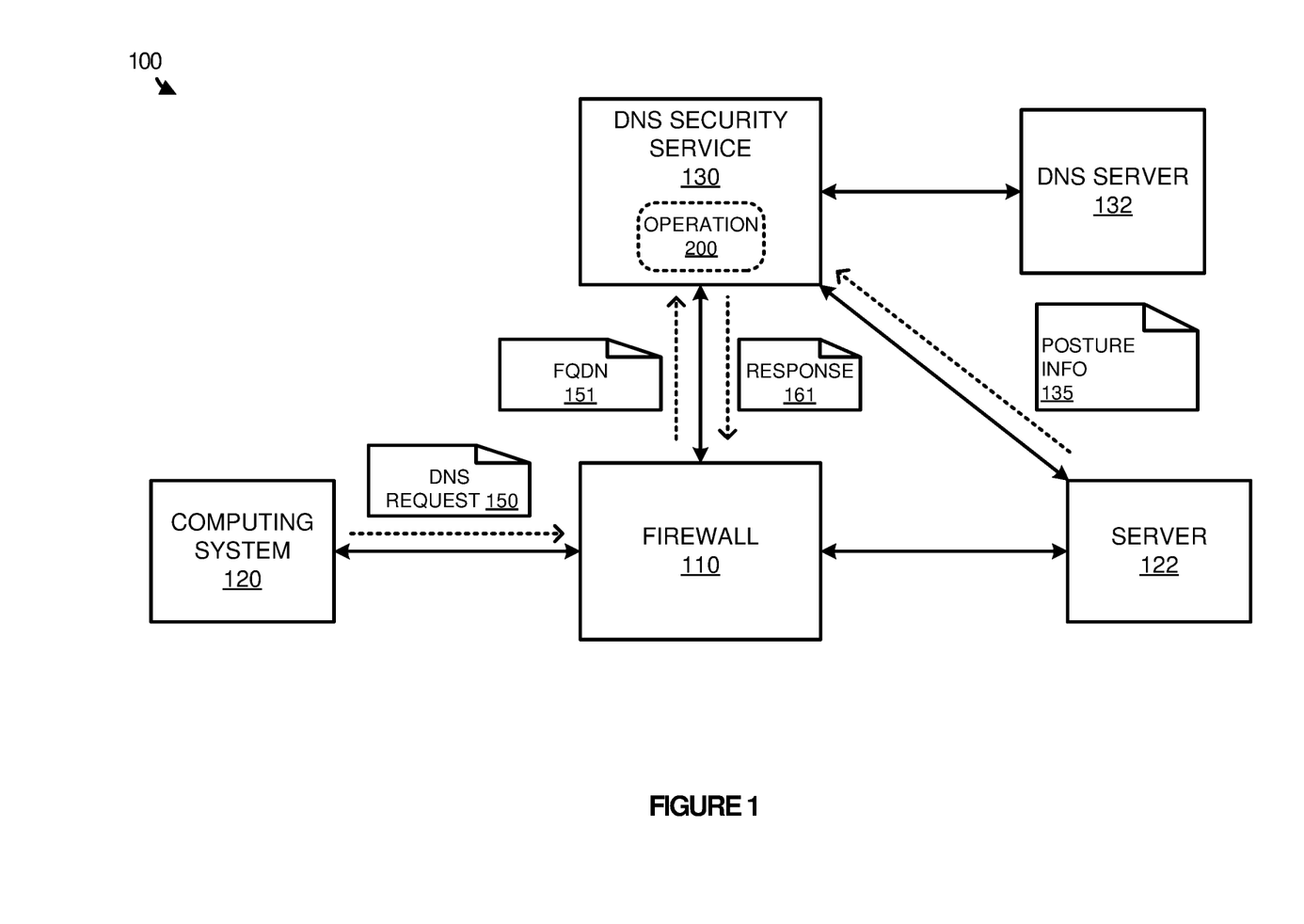
FIG. 1 illustrates a computing environment to manage permissions associated with fully qualified domain names (FQDNs) according to an implementation.

FIG. 1 illustrates a computing environment 100 to manage permissions associated with FQDN according to an implementation. Computing environment 100 includes computing system 120, firewall 110, domain name system (DNS) security service 130, and server 122. Computing environment 100 includes DNS request 150, fully qualified domain name (FQDN) 151, and response 161. Computing environment 100 further includes DNS server 132 that provides posture information 135. DNS security service 130 is configured to provide at least operation 200 that is described below with respect to FIG. 2.

In operation, firewall 110 may be used to provide security associated with computing systems or devices that attempt to connect over the network. The firewall monitors ingress and egress packets for the computing system and determines whether to allow, block, redirect, or provide some other operation in association with a packet or communication. Here, computing system 120 generates a DNS request 150 that includes a FQDN. A FQDN specifies the exact location in the tree hierarchy of the DNS. It specifies all domain levels, including the top-level domain and the root zone. In some examples, the FQDN can have a host name and at least one higher-level domain (label) and always ends in the top-level domain.

When the request is received by firewall 110, firewall 110 may provide or communicate the FQDN to DNS security service 130. DNS security service 130 is used to determine whether the FQDN requested from computing system 120 should be trusted or that the destination is likely malicious. To make this determination, DNS security service may calculate a trust score that can be used to select a traffic rule or action for the request, wherein the action may include permitting the DNS request and the communication, blocking the request and the communication, redirecting the request or communication, or providing some other action in association with the request. In generating the score, the DNS security service 130 may consider a variety of trust factors associated with the FQDN. The trust factors may include time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. The infrastructure information for the A or AAAA records may include information about the time to live associated with the FQDN, location of the record, or some other information associated with the record. The risk score of the authoritative Name Server may be determined based on reputation information provided from one or more sources and may be determined based on length of operation, owner, or some other information.

In some implementations, each of the factors may contribute to the score, wherein the score may comprise a numerical value, a letter grade, or some other scoring mechanism. For example, for a first quantity of requests for the FQDN, DNS security service 130 may allocate a first score, while for a second quantity of requests for the FQDN, DNS security service 130 may allocate a second score. The scores may then be aggregated for the various factors to determine a current score for the FQDN. Once the score is calculated in association with the FQDN, DNS security service 130 may determine traffic rules for the DNS request based on the score. In some implementations, different traffic rules may be deployed based on whether the score satisfies criteria or a threshold. For example, if a score satisfies a first score threshold, DNS security service 130 may permit the connection using the address associated with the FQDN. However, if the score satisfies a second score threshold, DNS security service 130 may block the connection with an associated IP address.

In some implementations, to determine an action associated with the FQDN, DNS security service 130 may determine whether the first score generated from the trust factors satisfies one or more criteria. When the score does not satisfy the one or more criteria (e.g., a threshold value), DNS security service 130 may use the existing score to determine an action in association with the FQDN (e.g., block the DNS request, permit the DNS request, and the like). In contrast, when the score does satisfy the one or more criteria, DNS security service 130 may identify host posture associated with the IP address in the DNS response (i.e., host posture for the data server the DNS response directs the request). This host posture may provide information about signatures, service packs, or other software information associated with at least the IP address in the DNS response and may determine whether the software is up to date on the corresponding host. For example, in response to evaluating FQDN 151 to determine a trust score, DNS security service 130 may request posture information 135 for the IP address associated server 122, wherein the IP address is provided in the response to the DNS request. Based on posture information 135, DNS security service 130 may update the score and may use the score to evaluate whether to permit or deny the request. In some implementations, DNS security service 130 may obtain the posture information from server 122 directly or may use another service to obtain the posture information. The posture information may be obtained in response to the DNS request or may be obtained at various intervals. For example, DNS security service 130 may, in response to receiving FQDN 151 and calculating a first trust score, request and obtain the most recent posture information from a service that monitors posture information associated with various IP addresses.

Figure 2:
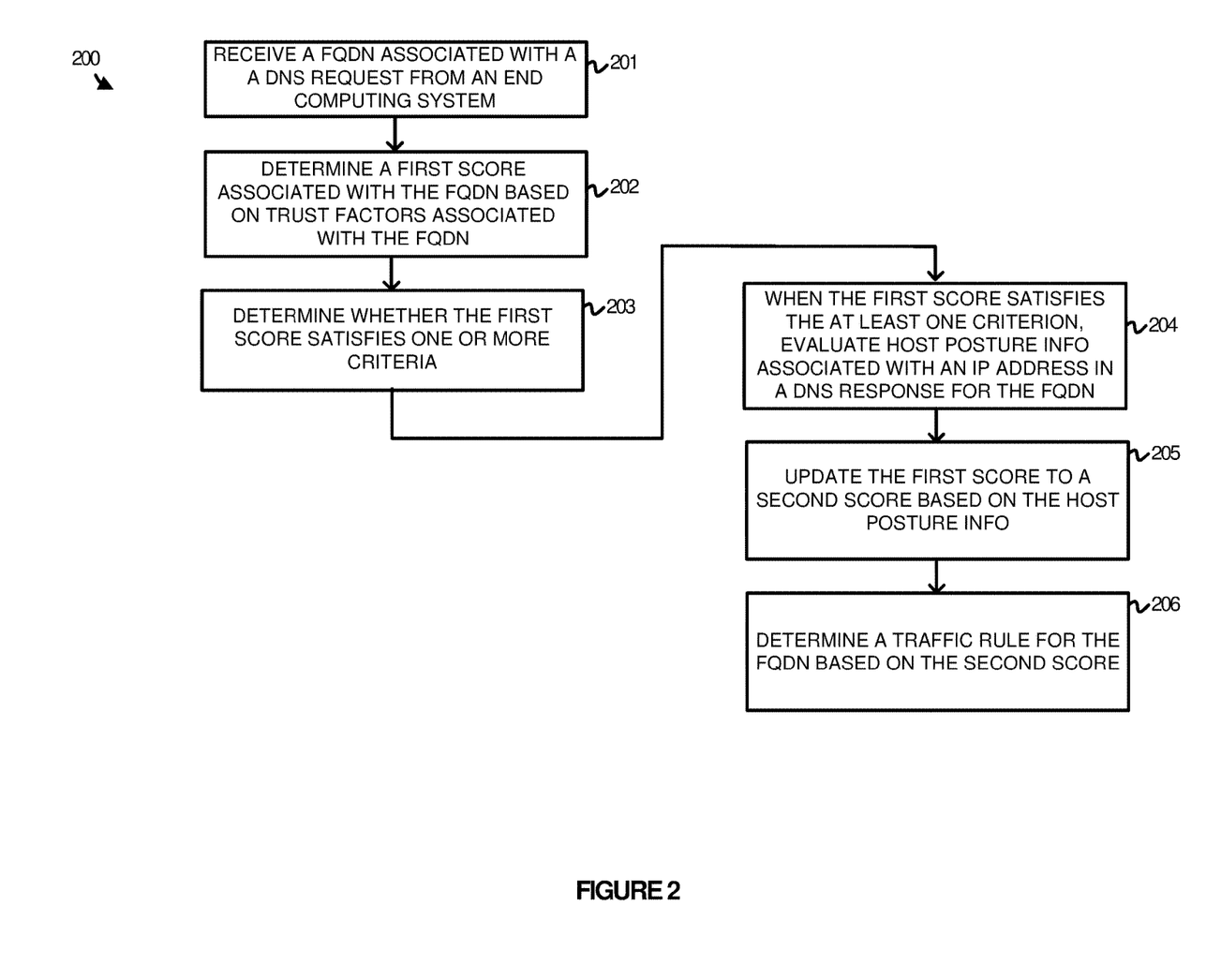
FIG. 2 illustrates an operation of a domain name system (DNS) security service to manage permissions associated with FQDNs based on according to an implementation.

FIG. 2 illustrates an operation 200 of a domain name system (DNS) security service to manage permissions associated with FQDNs according to an implementation. The steps of operation 200 are referenced parenthetically in the paragraphs that follow with reference to systems and elements of computing environment 100 of FIG. 1.

As depicted, operation 200 includes obtaining (201) a FQDN associated with a DNS request by a computing system. The DNS request may comprise a request from a physical computing device, such as a desktop computer, laptop computer, and the like, or may comprise a request from a virtual computing device, such as a virtual machine or container. When an FQDN is identified as part of the request by a firewall 110, the FQDN may be forwarded to DNS security service 130. Although demonstrated as separate in the example of FIG. 1, the operations of DNS security service 130 may be implemented wholly or partially at the computing system providing the firewall.

In response to obtaining the FQDN, operation 200 further generates (202) a first score for the FQDN based on trust factors associated with the FQDN. The trust factors may include, but are not limited to, time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. For each of the factors, a score may be determined that can contribute to the overall score associated with the FQDN. For example, a first authoritative Name Server may be allocated a first score based on its reputation (e.g., length of operation, owner, etc.), while a second authoritative Name Server may be allocated a second score based on its reputation. The score for the individual factor may be combined with scores associated with one or more other factors to determine the overall score associated with the FQDN. In some implementations, scores for some factors may weigh more heavily than scores associated with other factors. For example, the risk score associated with the authoritative Name Server may contribute more to the overall score for the FQDN than the score associated with the volume of queries for the FQDN.

Once the first score is determined for the FQDN, DNS security service 130 may determine (203) that the first score satisfies one or more criteria, wherein the one or more criteria may include a threshold score in some examples, a range of scores, a generation of a first score, or some other criteria. When the first score does not satisfy the one or more criteria, DNS security service 130 may determine a traffic rule based on the first score. The traffic rule may be used to block, permit, redirect, or provide some other action in association with the DNS request. For example, a request for a FQDN that is not associated with a high-risk score may have an action returned that permits the IP address to be returned to computing system 120.

In contrast, when the first score satisfies the one or more criteria, operation 200 further evaluates (204) the host posture information associated with an IP address in a DNS response for the FQDN. The host posture information may include status information associated with the software of the host associated with the IP address provided in the DNS response for the DNS request, wherein the status information can include signatures, service packs, or other software information associated with the host. In response to receiving posture information 135, operation 200 updates (205) the first score to a second score based on the posture information and determines (206) a traffic rule for the FQDN based on the second score.

In some implementations, when evaluating the posture information, DNS security service 130 may determine whether posture information 135 indicates that the host is possibly suspect or malicious. When posture information 135 does not provide any indication that the DNS server is possibly malicious, then the first score may be adjusted to indicate that the FQDN is less likely not malicious or may not make any changes to the first score. When posture information 135 does indicate that the host is possibly malicious, then the first score may be adjusted or increased to indicated that the FQDN is more likely to be malicious. To determine that the posture information indicates that the host is possibly malicious, posture information 135 may be compared to one or more criteria that can indicate whether the server is potentially malicious. The criteria may include a host not responding to a posture request, the host not providing an updated software version or history, a software version requirement, or some other criteria to indicate that the server is possibly malicious. In some implementations, depending on the information that is provided from the server, the modification to the first score may change. For example, first information may modify a score by a first amount, while second information may modify the score by a second amount.

In some implementations, posture information 135 is obtained directly by DNS security service 130 from server 122. The information may be obtained when a request for FQDN 151 is identified or may be retrieved at intervals. For example, DNS security service 130 may periodically check various IP addresses for host posture information and use the most recent information when an IP address is returned as part of a DNS response. In other implementations, DNS security service 130 may obtain the host posture information from another service that obtains and maintains host posture information associated with various IP addresses.

Figure 3A:
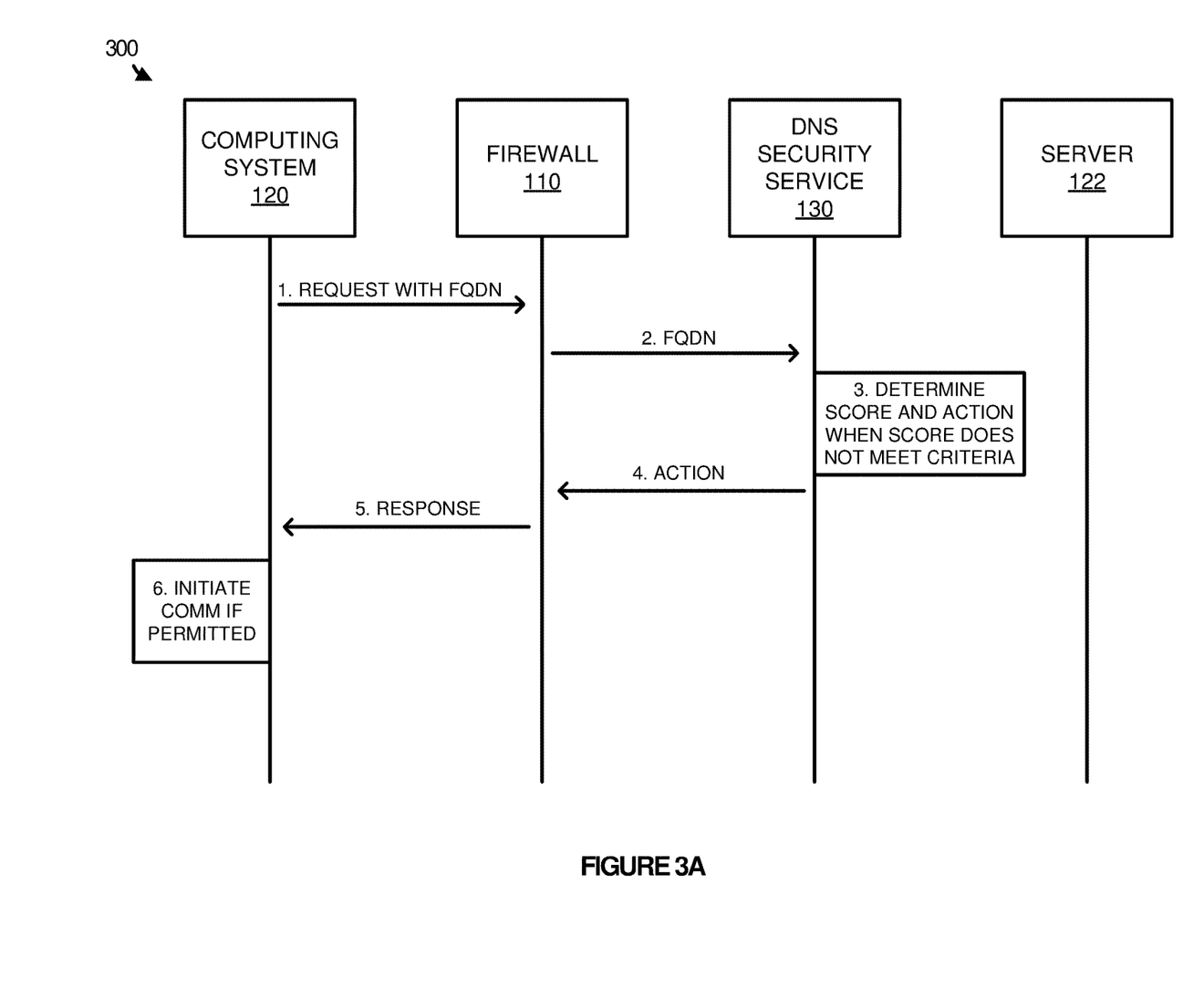
FIG. 3A-3B illustrate a timing diagram of managing permissions associated with a FQDN according to an implementation.
Figure 3B:
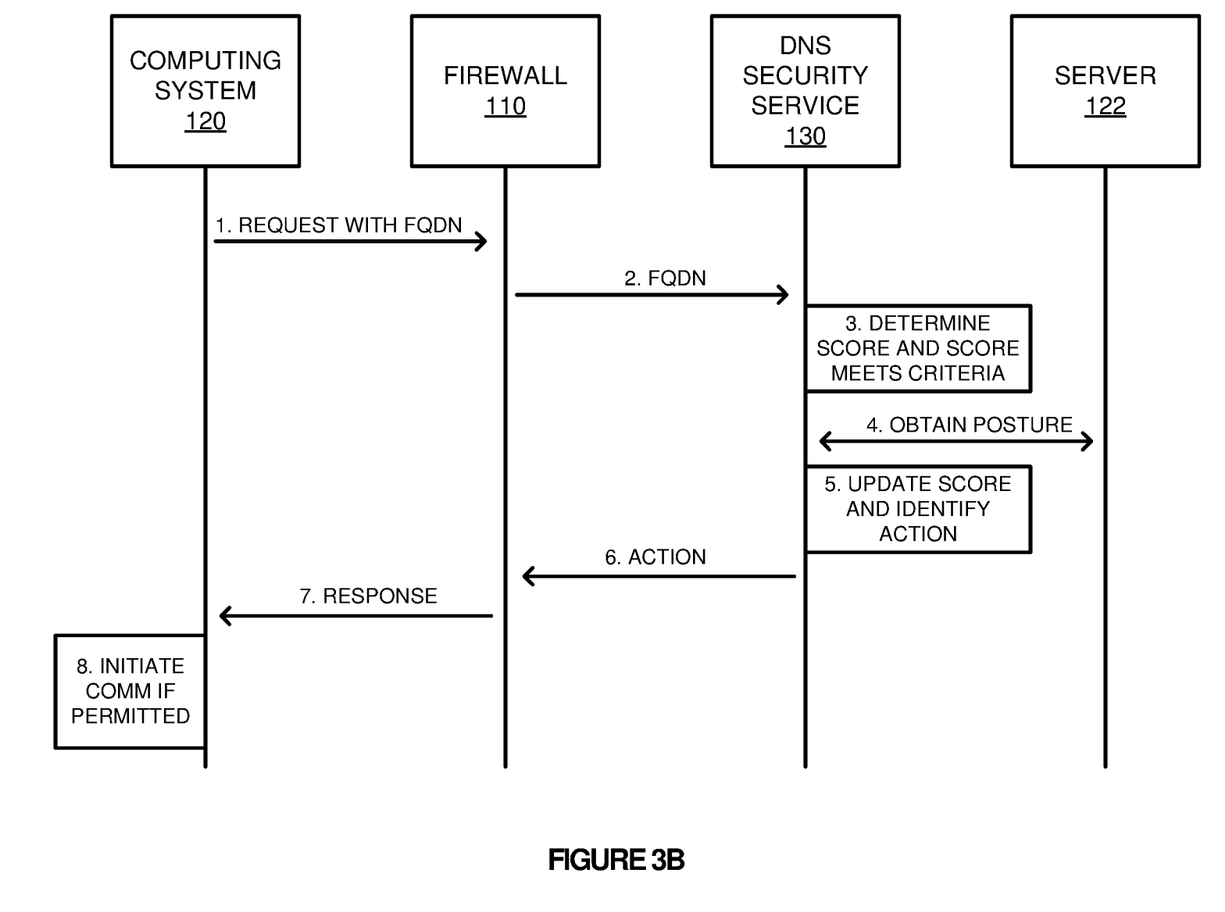

In some examples, DNS security service 130 may provide a first traffic rule or action, wherein the first traffic rule may be determined based on a default action, a trust score determined based on locally maintained information, or based on some other factor. After the first traffic rule is provided to firewall 110, DNS security service 130 may continue to evaluate or update the score and may update the traffic rule based on the score. As an example, when FQDN is first received by DNS security service 130, DNS security service 130 may provide a first traffic rule, wherein the first traffic rule may comprise a default rule or a rule based on trust factors currently available at DNS security service 130. After the first traffic rule is provided to firewall 110, DNS security service 130 may identify additional factors and may further identify posture information if the score satisfies the requisite criteria. Thus, after providing a traffic rule to firewall 110, DNS security service 130 may identify posture information 135 associated with server 122 and evaluate the posture information to update the score. The update to the score may then trigger an updated traffic rule. Additionally, DNS security service 130 may cache the score, enabling the service to respond quickly with traffic rules to future requests with the same FQDN FIGS. 3A-3B illustrate a timing diagram of managing permissions associated a FQDN according to an implementation. The timing diagram in FIGS. 3A and 3B include computing system 120, firewall 110, DNS security service 130, and server 122 from computing environment 100 of FIG. 1.

Referring first to FIG. 3A, computing system 120, generates a DNS request with a FQDN, at step 1, that is received by firewall 110. In response to the request, firewall 110 may provide, at step 2, the FQDN to DNS security service 130 for a trust analysis of the FQDN. DNS security service 130 then determines, at step 3, a score for the FQDN based on trust factors associated with the DNS target of the FQDN. The trust factors are associated with the service or infrastructure that is providing the DNS lookup associated with the FQDN. The trust factors may include time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. Additional factors may include the number of requests for the FQDN from other networks not supported by firewall 110, databases indicating potentially malicious Name Servers, or some other source of information related to the trust of the FQDN. The factors may be used to identify risks in association with the publishing or records of the FQDN as part of DNS, which may indicate that the end IP address is malicious. In some examples, each of the factors may include a contributory score to the overall score for the FQDN. Each of the factors may be weighted evenly or may be weighted differently in contributing to the overall score. For example, a contributory score related to the authoritative name server may contribute more to the overall score than the quantity of requests for the FQDN.

Once the score is determined for the FQDN, DNS security service 130 may determine whether the action meets criteria to determine host posture associated with the DNS server. The criteria may comprise a threshold, a range of scores, a first query with the FQDN, or some other criteria. In some implementations, the criteria may correspond to a score where DNS security service 130 is unable to determine whether the DNS server is potentially suspicious. For example, the criteria may comprise a range of scores that indicate an inability to determine whether the FQDN is associated with a potentially malicious destination.

If it is determined that host posture is not required in association with the FQDN, an action or traffic rule for the request is identified and provided, at step 4, to firewall 110. The traffic rule may be identified based on the score satisfying one or more criteria associated with the traffic rule. The traffic rule may indicate to firewall 110 whether to block, permit, redirect, or perform some other action in association with the DNS request. In some implementations, if the DNS request is blocked in association with the FQDN, then firewall 110 may never provide an IP address to the requesting computing system. In other examples, where the request is permitted for the FQDN, firewall 110 may provide the IP address identified during a DNS lookup. In still further examples, if the request for the FQDN should be redirected, firewall 110 may provide a different IP address in place of the IP address for the FQDN. This alternative IP address may be used to indicate to the requesting computing system that the requested destination server could be malicious. Here, firewall 110 provides a response, at step 5, to computing system 120 for the DNS request and computing system 120 initiates, at step 6, a connection with server 122 if the connection is allowed.

In some implementations, rather than blocking the DNS response to computing system 120 based on a traffic rule, firewall 110 may provide the IP address for the DNS request, but block, terminate, or reset the connection with the server to prevent communications between computing system 120 and server 122. In some examples, firewall 110 may cache the most recent traffic rule identified for a FQDN and enforce the rule until an update is provided by DNS security service 130. In some examples, the action provided by DNS may permit an initial connection but gather additional information about the FQDN and update the action based on the additional information. Advantageously, a first action can be communicated to firewall 110 that permits the connection while additional information is obtained or monitored in association with DNS server. If the additional information indicates that the connection is malicious, DNS security service 130 may provide an additional action that prevents future connections or terminates existing connections. The additional information may include the trust factors associated with the DNS Turning to FIG. 3B, computing system 120 generates and communicates a second DNS request with a FQDN at step 1. The FQDN in the request may comprise the same FQDN as FIG. 3A or may comprise a different FQDN. In response to receiving the request at firewall 110, firewall 110 communicates the FQDN to DNS security service 130 at step 2, wherein DNS security service 130 determines a score for the FQDN based on trust factors and determines whether the score meets one or more criteria to identify a host posture associated with an IP address provided as part of the DNS response. In this example, the IP address associated with server 122. In some implementations, the trust score may be determined from multiple queries using the FQDN, wherein the score can be updated after each request, periodically, or at some other interval. When the request satisfies the one or more criteria, DNS security service 130 may obtain posture information associated with the IP address in the DNS request at step 4 and update the score for the FQDN based on the posture information. In some implementations, when the posture information indicates that the posture of the host system is potentially suspicious, DNS security service 130 may update the first score to a second score that further supports the FQDN is potentially malicious. Once the second score is determined, DNS security service 130 may select an action from a plurality of actions and communicate the action to firewall 110 at step 6. Once provided, firewall 110 may provide a response to computing system 120 at step 7 and computing system 120 may initiate a communication with the destination server 122 if the communication is permitted by the action from DNS security service 130.

Although demonstrated in the example of FIG. 3B as obtaining the posture information directly from server 122 (e.g., the host associated with the IP address in the DNS response), the posture information may be obtained from a secondary service in some examples. The secondary service may periodically or at some other interval check posture information associated with IP addresses. In other implementations, DNS security service 130 may perform the operations of the secondary service by periodically or at some other interval checking posture information associated with various IP addresses. In still other implementations, DNS security service 130 may communicate the host (server 122) when the score satisfies the one or more criteria to identify host posture. While demonstrated in the previous example as checking host posture associated with the IP address in the DNS response, DNS security service 130 may further check host posture associated with the A/AAAA records, host posture associated with the DNS server, or some other host posture information.

In some implementations, the action associated with an FQDN may change as a function of time. For example, when a request is first received in association with the FQDN, firewall 110 and/or DNS security service 130 may permit the connection. DNS security service 130 may then evaluate the trust factors and/or the posture associated with the host to determine whether the action should change in association with the FQDN. For example, when the FQDN is first requested, a first action may be provided to firewall 110 indicating that the connection is permitted. After evaluating the trust score and/or the posture information associated with the IP address returned for the FQDN, DNS security service 130 may provide a second action indicating that the connection should be blocked. Firewall 110 may then block future connections in association with the FQDN, terminate any existing connections, or provide some other operation. In some examples, the first action may be provided using first trust factors, while additional trust factors may take additional time and may modify the action in association with the FQDN. The additional time could be caused by using one or more external databases, testing times or latency, or some other factor.

Figure 4:
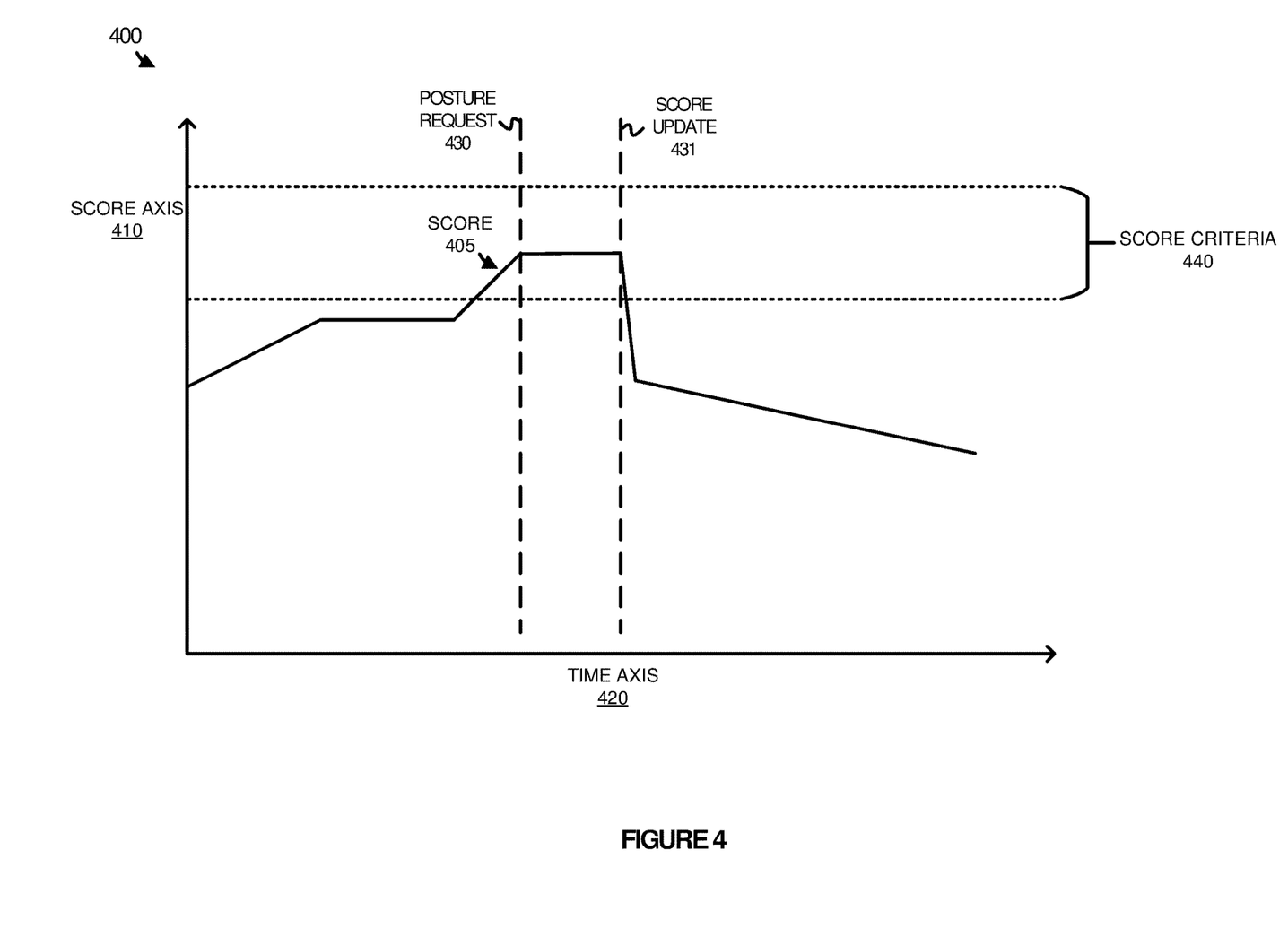
FIG. 4 illustrates a graph demonstrating the trust score for a FQDN according to an implementation.

FIG. 4 illustrates a graph 400 demonstrating the trust score for a FQDN according to an implementation. Graph 400 includes trust axis 410, time axis 420, score 405, posture request 430, and score update 431. Graph 400 further includes score criteria 440 that represents criteria for retrieving host posture associated with a FQDN.

In a computing environment, a firewall may monitor for DNS requests with various FQDNs. In response to receiving a DNS request, the FQDN for the request can be provided to a DNS security service. In response to receiving the FQDN, the DNS security service can use trust factors to determine score 405, wherein score 405 may be adjusted as additional trust factors are identified or the existing trust factors change as a function of time. Based on score 405, the DNS security service may provide actions or traffic rules to the firewall associated with the DNS request that permits the firewall to block, permit, redirect, or provide some other action in association with the communication.

In the example of graph 400, the DNS monitoring service generates a posture request 430 in association with an IP address provided as part of the DNS response for the FQDN. The posture request may be used to identify software status information, including system updates, software updates, security status information, or other software status information associated with the DNS server. In response to receiving the software status information associated with the host, the DNS monitoring service may generate score update 431 that can adjust score 405 associated with the FQDN.

Here, to determine whether to generate the posture request, the DNS monitoring service may determine whether the score associated with the FQDN falls within score criteria 440. When the score satisfies score criteria 440, the DNS monitoring service generates the posture request and provides score update 431 based on the posture information provided in association with the IP address for the FQDN. In some implementations, when the posture information is received, the DNS monitoring service may determine whether the posture information satisfies one or more criteria to indicate that the host server is suspicious. For example, the posture information may indicate that the server has been active for a short period or fails to include updated security software. Accordingly, the DNS monitoring service my update the trust score associated with the FQDN based on the determination.

After determining the score for the FQDN, the monitoring service further determines a traffic rule for the FQDN based on the score. In some implementations, when a FQDN is requested by a computing device, the monitoring service can determine a score using the trust factors and posture information and return a traffic rule that permits or blocks the communication. In some examples, the score and the traffic rule can be updated as additional information is obtained or the information changes in association with the FQDN. As a result, although a first traffic rule is provided to a firewall, the rule can be updated at the next request or at some other interval.

In some implementations, the DNS security system may set a timeout that is used to reset the score associated with the FQDN score. The timeout may occur when a request has not occurred for the FQDN within a period, when the FQDN score has been maintained for a period, or at some other interval. When a new request is received, the DNS security service may calculate a new score and update the score based on any subsequent requests. Additionally, the trust factors and posture information may expire, requiring the DNS security service to request and receive additional information that can be used to update the score.

Figure 5:
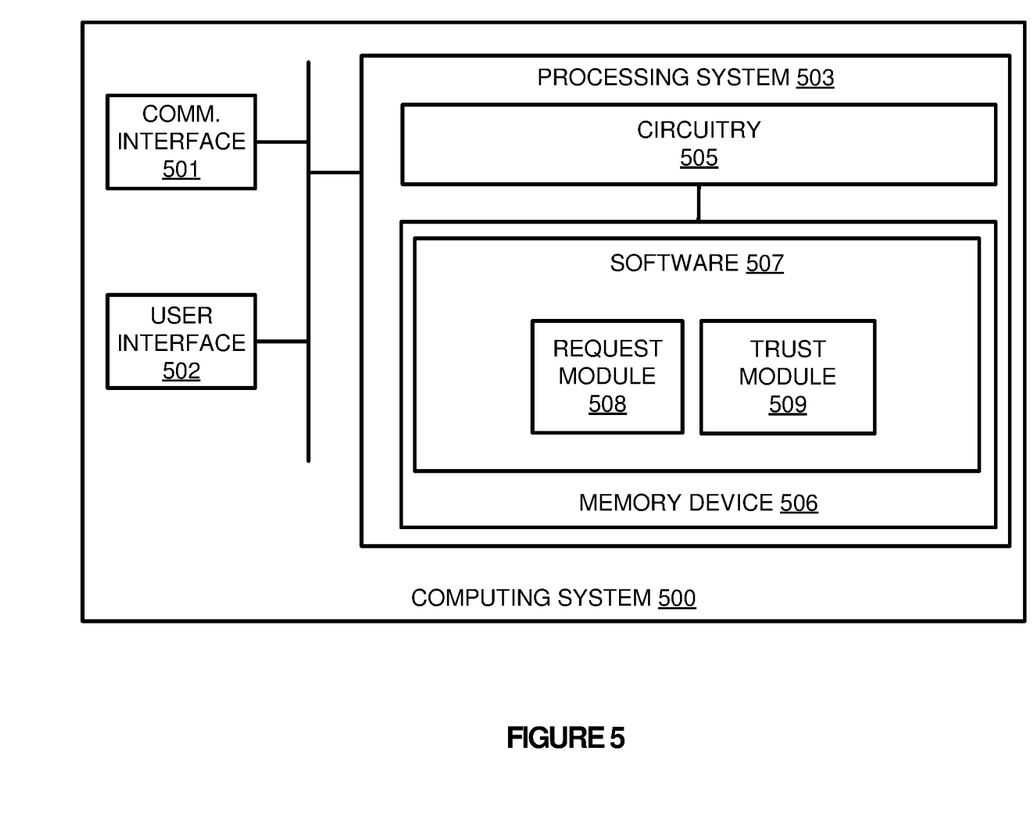
FIG. 5 illustrates a DNS security service computing system according to an implementation.

FIG. 5 illustrates a DNS security service computing system 500 according to an implementation. Computing system 500 is representative of any computing system or systems with which the various operational architectures, processes, scenarios, and sequences disclosed herein for a DNS security service may be implemented. Computing system 500 is an example DNS security service 130, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 may communicate with a firewall implemented in a computing system or systems. Communication interface 501 may further be used to connect the one or more computing systems to computing elements, such as servers or clients, over the internet.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes request module 508 and trust module 509, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, request module 508 directs processing system 503 to obtain a FQDN associated with a domain name system DNS request by a computing device. In some implementations, when a firewall identifies a DNS request with a FQDN, the FQDN is forwarded to the computing system 500. Once the FQDN is received, trust module 509 directs processing system 503 to generate a first score for the FQDN based on trust factors associated with the FQDN. The trust factors may include, but are not limited to, time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. The trust factors correspond to the infrastructure that is used in responding to the DNS request, wherein the infrastructure may comprise services, servers, certificates, records, and the like associated with responding to the DNS request.

In some implementations, each of the factors may contribute equally to creating the overall score associated with the FQDN. In other implementations, factors may be weighted differently providing more emphasis on one factor over another. The score may comprise a numerical value (e.g., 0-100), may comprise a letter grade, or may comprise some other scoring mechanism. The information for the factors may be maintained locally, such as information risk status of different Name Servers, or may be stored at least partially on external services or databases that can provide information about the infrastructure associated with providing the DNS response. The information may then be processed to generate a score.

After the score is generated, trust module 509 directs processing system 503 to determine whether the score satisfies one or more criteria to obtain posture information associated with the DNS server for the request. For example, when the score is within a range, trust module 509 may direct processing system 503 to obtain posture information in association with the IP address provided in the DNS response. When the posture information is obtained, trust module 509 can direct processing system 503 to update the score associated with the FQDN. In some examples, the score is only updated when the posture information indicates that the host server is suspicious, however, the update may be used to increase or decrease the trust score in some examples. The posture information for the IP address in the DNS response may also be used in association with other FQDNs with DNS responses that include the same IP address.

Once a score is identified for the FQDN, trust module 509 may direct processing system 503 to determine a traffic rule from a plurality of traffic rules for the DNS request based on the first score. The traffic rule may be based on the score satisfying criteria or a threshold associated with the traffic rule. The traffic rule may indicate that the request is permitted, blocked, should be redirected, or some other action in association with the DNS request. Once the rule is selected, the rule may be provided to the firewall to implement the rule.

Once an initial score is generated for the FQDN, request module 508 may direct processing system 503 to obtain one or more notifications of one or more additional DNS requests for the FQDN. In response to the one or more notification, trust module 509 directs processing system 503 to update the first score to a second score based on the trust factors associated with the FQDN. As the notifications are received, the trust module 503 may update the information associated with the factors. For example, trust module 503 may update counters associated with the number of DNS requests with the FQDN. Based on the updated factors, a second score can be generated that is an update of the first score. The second score can then be used by trust module 509 to select a traffic rule for the FQDN and provide the selected rule to the firewall for enforcement.

Although described as separate from the firewall, at least a portion of the operations of the DNS security service may be implemented in the firewall. In other examples, DNS security service 130 may be deployed in a cloud computing center or a server, wherein one or more firewalls may provide FQDNs to the DNS security service for processing and a determination of the traffic rules.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   obtaining a fully qualified domain name (FQDN) associated with a domain name system (DNS) request by a computing device;
   in response to the obtaining of the FQDN, determining a first score for the FQDN based on trust factors associated with the FQDN, wherein the first score is indicative of whether a connection should be allowed to a host associated with the FQDN;
   in response to determining that the first score satisfies one or more criteria, evaluating host posture information for the host having an internet protocol (IP) address provided for the FQDN in a DNS response to the DNS request, wherein the host posture information comprises information about software status on the host;
   updating the first score to a second score based on the host posture information, wherein the second score is more indicative than the first score that the connection should not be allowed when the host posture information indicates the host is likely suspicious or malicious; and
   determining a traffic rule from a plurality of traffic rules for the FQDN based on the second score.

2. The method of claim 1, wherein the second score remains the same as the first score when the host posture information does not indicate the host is likely suspicious or malicious.

3. The method of claim 1, wherein the trust factors comprise at least time delta information between requests for the FQDN and a volume of queries for a period.

4. The method of claim 1, wherein the trust factors comprise popularity information for the FQDN globally.

5. The method of claim 1, wherein the trust factors comprise scores associated with infrastructure to which the A or AAAA records for the FQDN point, a risk score of an authoritative Name Server for the FQDN, or a quantity of record changes for the FQDN.

6. The method of claim 1, wherein the plurality of traffic rules comprises a rule to allow traffic, a rule to redirect traffic, and a rule to block traffic.

7. The method of claim 1, wherein the host posture information comprises software version information.

8. The method of claim 1 further comprising:
   obtaining a second FQDN associated with a DNS request by a second computing device;
   determining a third score for the second FQDN based on trust factors associated with the second FQDN;
   in response to determining that the third score fails to satisfy the one or more criteria, determining a traffic rule for the second FQDN based on the third score; and
   communicating the traffic rule for the second FQDN to a firewall.

9. The method of claim 1 further comprising communicating the traffic rule to a firewall associated with the computing device.

10. A computing apparatus comprising:
    a storage system comprising one or more non-transitory computer readable storage media;
    a processing system comprising at least one processor and operatively coupled to the storage system; and
    program instructions stored on the storage system that, when executed by the processing system, direct the computing apparatus to:
      obtain a fully qualified domain name (FQDN) associated with a domain name system (DNS) request by a computing device;
      in response to the obtaining of the FQDN, determine a first score for the FQDN based on trust factors associated with the FQDN, wherein the first score is indicative of whether a connection should be allowed to a host associated with the FQDN;
      in response to a determination that the first score satisfies one or more criteria, evaluate host posture information for the host having an internet protocol (IP) address provided for the FQDN in a DNS response to the DNS request, wherein the host posture information comprises information about software status on the host;
      update the first score to a second score based on the host posture information, wherein the second score is more indicative than the first score that the connection should not be allowed when the host posture information indicates the host is likely suspicious or malicious; and
      determine a traffic rule from a plurality of traffic rules for the FQDN based on the second score.

11. The computing apparatus of claim 10, wherein the second score remains the same as the first score when the host posture information does not indicate the host is likely suspicious or malicious.

12. The computing apparatus of claim 10, wherein the trust factors comprise at least time delta information between requests for the FQDN and a volume of queries for a period.

13. The computing apparatus of claim 10, wherein the trust factors comprise popularity information for the FQDN globally.

14. The computing apparatus of claim 10, wherein the trust factors comprise scores associated with infrastructure to which the A or AAAA records for the FQDN point, a risk score of an authoritative Name Server for the FQDN, or a quantity of record changes for the FQDN.

15. The computing apparatus of claim 10, wherein the plurality of traffic rules comprises a rule to allow traffic, a rule to redirect traffic, and a rule to block traffic.

16. The computing apparatus of claim 10, wherein the host posture information comprises software version information.

17. The computing apparatus of claim 10, wherein the program instructions further direct the computing apparatus to:
    obtain a second FQDN associated with a DNS request by a second computing device;
    determine a third score for the second FQDN based on trust factors associated with the second FQDN;
    in response to a determination that the third score fails to satisfy the one or more criteria, determine a traffic rule for the second FQDN based on the third score; and
    communicate the traffic rule for the second FQDN to a firewall.

18. The computing apparatus of claim 10, wherein the program instructions further direct the computing apparatus to communicate the traffic rule to a firewall associated with the computing device.

19. A system comprising:
    a first computer configured to:
      receive a fully qualified domain name (FQDN) as part of a domain name system (DNS) request by a computing device;
      communicate the FQDN to a second computer; and the second computer configured to:
- obtain the FQDN from the first computer;
- in response to the obtaining of the FQDN, determine a first score for the FQDN based on trust factors associated with the FQDN, wherein the first score is indicative of whether a connection should be allowed to a host associated with the FQDN;
- in response to a determination that the first score satisfies one or more criteria, evaluate host posture information for the host having an internet protocol (IP) address provided for the FQDN in a DNS response to the DNS request, wherein the host posture information comprises information about software status on the host;
- update the first score to a second score based on the host posture information, wherein the second score is more indicative than the first score that the connection should not be allowed when the host posture information indicates the host is likely suspicious or malicious; and
- determine a traffic rule from a plurality of traffic rules for the FQDN based on the second score.

20. The system of claim 19, wherein the plurality of traffic rules comprises a rule to allow traffic, a rule to redirect traffic, and a rule to block traffic.

* * * * *